United States Patent
Hegna et al.

(10) Patent No.: US 9,915,745 B2
(45) Date of Patent: Mar. 13, 2018

(54) SEPARATION OF UP-GOING AND DOWN-GOING WAVEFIELDS INCLUDING THE DIRECT ARRIVAL

(71) Applicant: PGS Geophysical AS, Oslo (NO)

(72) Inventors: Stian Hegna, Hovik (NO); Tilman Kluver, Sande (NO)

(73) Assignee: PGS Geophysical AS, Oslo (NO)

(*) Notice: Subject to any disclaimer, the term of this patent is extended or adjusted under 35 U.S.C. 154(b) by 163 days.

(21) Appl. No.: 15/084,748

(22) Filed: Mar. 30, 2016

(65) Prior Publication Data

US 2016/0377756 A1  Dec. 29, 2016

Related U.S. Application Data

(60) Provisional application No. 62/185,793, filed on Jun. 29, 2015.

(51) Int. Cl.
*G01V 1/38* (2006.01)
*G01V 1/36* (2006.01)

(52) U.S. Cl.
CPC .......... *G01V 1/364* (2013.01); *G01V 1/36* (2013.01); *G01V 1/38* (2013.01); *G01V 1/3808* (2013.01); *G01V 2210/56* (2013.01)

(58) Field of Classification Search
CPC ................................. G01V 2210/56
USPC .......................................... 367/24
See application file for complete search history.

(56) References Cited

U.S. PATENT DOCUMENTS

| | | | |
|---|---|---|---|
| 5,235,554 A * | 8/1993 | Barr | G01V 1/364 367/13 |
| 5,621,699 A * | 4/1997 | Rigsby | G01V 1/3808 367/22 |
| 5,774,417 A * | 6/1998 | Corrigan | G01V 1/36 367/21 |
| 7,359,283 B2 | 4/2008 | Vaage et al. | |
| 7,778,108 B2 * | 8/2010 | Van Manen | G01V 1/364 367/15 |
| 2003/0048696 A1 * | 3/2003 | Duren | G01V 1/364 367/24 |
| 2005/0195686 A1 | 9/2005 | Vaage et al. | |
| 2012/0069704 A1 * | 3/2012 | Cambois | G01V 1/3835 367/21 |
| 2015/0003196 A1 | 1/2015 | Hegna | |

(Continued)

OTHER PUBLICATIONS

Extended European Search Report for European Patent Application No. 16176251.3-1559, dated Nov. 7, 2016.
(Continued)

*Primary Examiner* — Ian J Lobo (57) ABSTRACT

At least some embodiments are directed to a system. The system includes a processor and a memory coupled to the processor. The memory stores a program that, when executed by the processor, causes the processor to calculate a pressure response of a first sensor, and correct pressure wavefield data obtained from the first sensor responsive to a first acoustic wavefield. The correction is based on the calculated pressure response of the first sensor. The pressure response of the first sensor is responsive to a second acoustic wavefield having a propagation path between a source of the second acoustic wavefield and the first sensor, in which the propagation path includes no reflection from a subsurface formation.

28 Claims, 9 Drawing Sheets

(56) References Cited

U.S. PATENT DOCUMENTS

2015/0293241 A1 10/2015 Hegna
2015/0293242 A1 10/2015 Hegna

OTHER PUBLICATIONS

Majdanski, Mariusz et al: "Attenuation of Free-Surface Multiples by Up/Down Deconvolution for Marine Towed-Streamer Data", Society of Exploration Geophysicists, Nov. 1, 2011, vol. 76, No. 6, US.

Amundsen, Lasse et al: "Attenuation of Free-Surface Multiples From Marine Pressure and Pressure Gradienr", EAGE Conference and Exhibition, Jun. 2, 2003, pp. 1-04.

Amundsen, Lasse: "Wavenumber-Based Filtering of Marine Point-Source Data", Society of Exploration Geophysicists, Sep. 1, 1993, vol. 58, No. 9.

Carlson, David et al: "Increased Resolution and Penetration from a Towed Dual-Sensor Streamer", First Break, Dec. 1, 2007.

Majdanski, et al., Attenuation of free-surface multiples by up/down deconvolution for marine towed-streamer data, Geophysics, vol. 76, No. 6, Nov.-Dec. 2011, pp. V129-V138.

\* cited by examiner

SEPARATION OF UP-GOING AND DOWN-GOING WAVEFIELDS INCLUDING THE DIRECT ARRIVAL

CROSS-REFERENCE TO RELATED APPLICATIONS

This application claims the benefit of U.S. Provisional Application Ser. No. 62/185,793 filed Jun. 29, 2015 and titled "Separation of Up-Going and Down-Going Wavefields Including the Direct Arrival". The provisional application is incorporated by reference herein as if reproduced in full below.

BACKGROUND

In seismic exploration of formations below bodies of water, such as a lake or ocean, in some cases an acoustic source is used to create the interrogating energy. In particular, the acoustic source is suspended in the water at a known depth and the acoustic source is activated at known times. The acoustic wavefield, comprising pressure wavefield and fluid particle velocity wavefield components, propagates through the water, into the formation below the sea floor, and a portion of the acoustic energy therein is reflected and propagates back for detection by sensors deployed in the water body or on the sea floor beneath the water body. (The pressure and fluid particle velocity wavefield components may simply be referred to as pressure and fluid particle velocity wavefields, respectively.) Based on the known activation time of the acoustic source, the known velocity of the acoustic signal in the water, and a velocity model of the formation layers below the sea floor, the depth of the various acoustic reflectors can be determined with relatively good accuracy.

The acoustic energy impinging on the sensors may include both an upward propagating wavefield from reflections occurring beneath the sensors and a downward propagating wavefield from reflections at the surface of the water body. The separation of the wavefields may include estimating fluid particle velocities from pressure measurements in at least a portion of the spectrum of the wavefields. However, in addition to the reflected wavefields, the sensors experience an acoustic wavefield propagating directly from the source (the "direct arrival"). An issue in separating the up-going and down-going wavefields is the proper correction of the direct arrival when estimating fluid particle velocities from pressure measurements.

BRIEF DESCRIPTION OF THE DRAWINGS

For a detailed description of exemplary embodiments, reference will now be made to the accompanying drawings in which:

FIG. 6, comprising sheets 6A and 6B, shows a flowchart of a method in accordance with at least some embodiments.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Notional" source signature" shall mean the time-dependent wavefield emitted by a single acoustic source. The notional source signature may be represented in a time domain or a frequency domain.

"Co-located" in the context of two or more sensors shall mean located within 0.1 wavelength of a seismic acoustic signal proximate to the sensors.

"Corner frequency" shall mean, with respect to a filter, the frequency at which an output of the filter falls below a nominal passband output value by preselected amount. For example, if the predetermined amount is 3 dB, the corner frequency may be referred to as a 3 dB corner.

"Vertical" shall mean in the context of a direction, parallel to the direction of Earth's gravity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
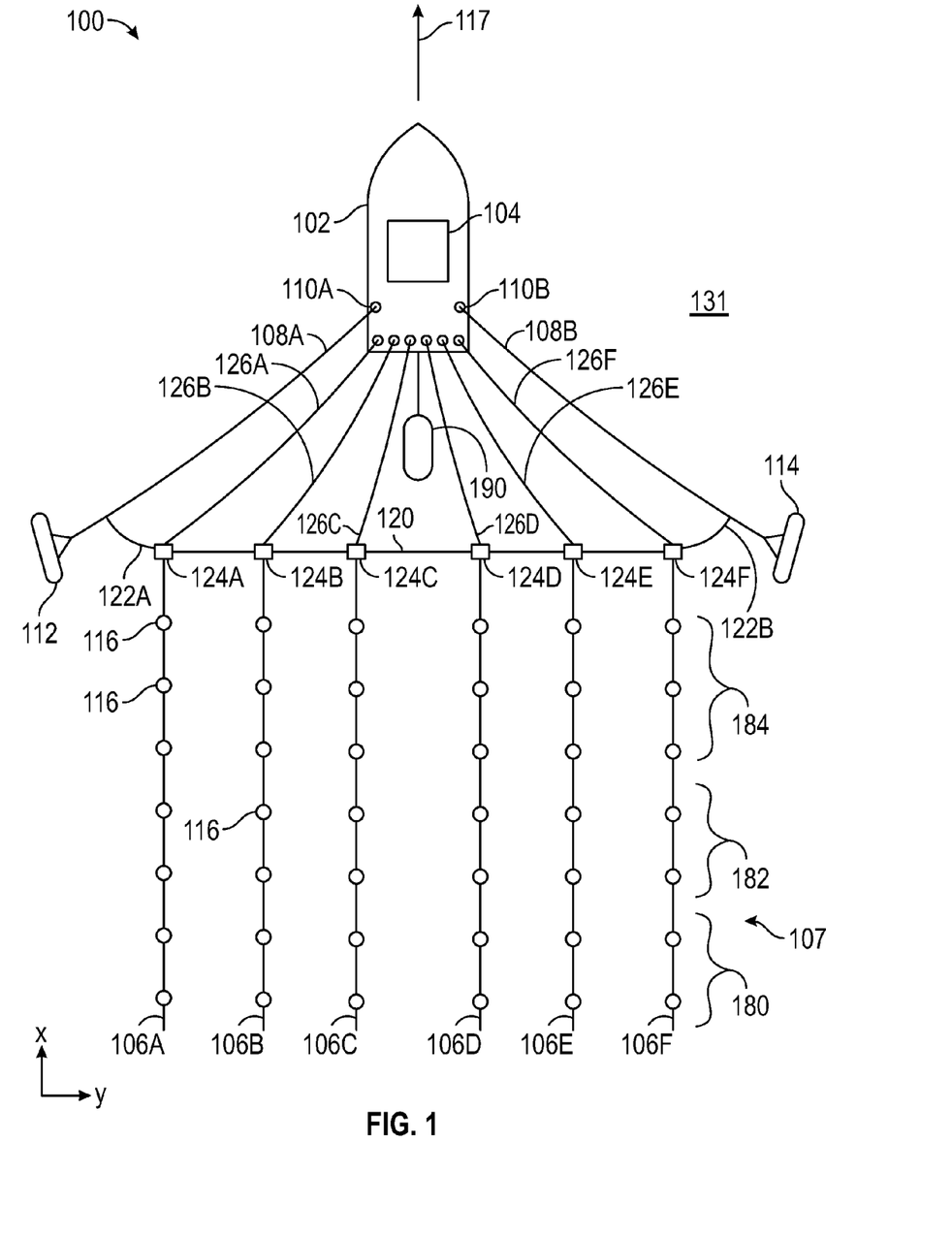
FIG. 1 shows an overhead view of a marine survey in accordance with at least some embodiments.

FIG. 1 shows an overhead view of a marine survey system 100 in accordance with at least some embodiments. In particular, FIG. 1 shows a survey or tow vessel 102 having onboard equipment 104, such as navigation, energy source control, and data recording and processing equipment. In at least some embodiments, data processing equipment included in onboard equipment 104 may be configured to perform some or all of the processes described further below. Vessel 102 is configured to tow one or more sensor streamers 106A-F through a water body 131. While FIG. 1 illustratively shows six sensor streamers 106, any number of sensor streamers 106 may be used. A horizontal coordinate system may be defined by the array 107 of sensor streamers wherein the direction parallel to the sensor streamers defines an inline direction, labeled x, and a direction orthogonal thereto, or cross-line direction, labeled y.

In the example system, the sensor streamers 106 are coupled to towing equipment that maintains the sensor streamers 106 at selected depth and lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120 or, as illustrated, couple to the spreader line by way of spur lines 122A and 122B.

As illustrated, the sensor streamers 106 are each coupled, at the ends nearest the vessel 102 (i.e., the proximal ends), to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the onboard equipment 104 and the sensors 116 in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed. The illustrated towing equipment may be used alone or in conjunction with other lateral position and depth control equipment. Other example systems may have more complex or simpler towing arrangements.

Each sensor streamer 106 may comprise an elongated outer jacket defining an interior volume. The elongated outer jacket defines a central axis along the long dimension of the sensor streamer. In the example situation of FIG. 1, the central axis of each sensor streamer is parallel to the direction of travel of the tow vessel 102, the direction of travel indicated by arrow 117. The sensors 116 may reside within the interior volume or on the elongated outer jacket, and the sensors may be longitudinally spaced along each sensor streamer 106. In some embodiments, the sensors 116 are geophones which are sensitive to fluid particle velocity. The geophones may be suspended in a gimbal arrangement such that each geophone is most sensitive to a vertical component of fluid particle velocity (i.e., velocity aligned with the force of gravity). In other embodiments, sensors 116 may be geophones sensitive to three components of fluid particle velocity. In still other embodiments, the sensors 116 are hydrophones which are sensitive to acoustic pressure. In yet still other cases, the sensors 116 may include one or any combination of the following: geophones; hydrophones, co-located geophones and hydrophones, accelerometers, solid-state motion sensors (MEMS), orientation sensors, and electromagnetic sensors. Sensor streamers 106 may each have any length. In an example system the sensor streamers may be between 5 kilometers (km) and 15 km. Although it may be possible to have the onboard equipment 104 record signals from each sensor 116 individually, in some cases the sensors associated with a sensor streamer are logically divided into arrays for purposes of recording received signals, such as sensor arrays 180, 182, and 184 associated with sensor streamer 106F Still referring to FIG. 1, in some situations the tow vessel 102, in addition to towing the sensor streamers 106, may also tow an acoustic source 190. The acoustic source 190 may take any suitable form, such as an air gun-type system, or a marine vibrator, for example. In other cases, however, a separate vessel may tow the acoustic source 190 such that certain predetermined relationships between the physical location of the sensor streamers 106, the underground hydrocarbon bearing formation, and the acoustic source 190 may be achieved. Further, in at least some other embodiments, two or more acoustic sources may be deployed in a marine geophysical survey.

FIG. 2 and FIGS. 3-5 described below, further illustrate the principles of the disclosed embodiments. In particular, FIGS. 2-5 show aspects of acoustic wavefields emitted into water body 131 by acoustic source 190. It would be appreciated by those skilled in the art with the benefit of this disclosure that while depicted in separate figures for ease of illustration, these aspects are all associated with any single firing of the acoustic source. It would be further appreciated that, at the position of any particular sensor, the sensor responds to the superposition of the wavefields impinging thereon as described separately in conjunction with FIGS. 2-5.

Figure 2:
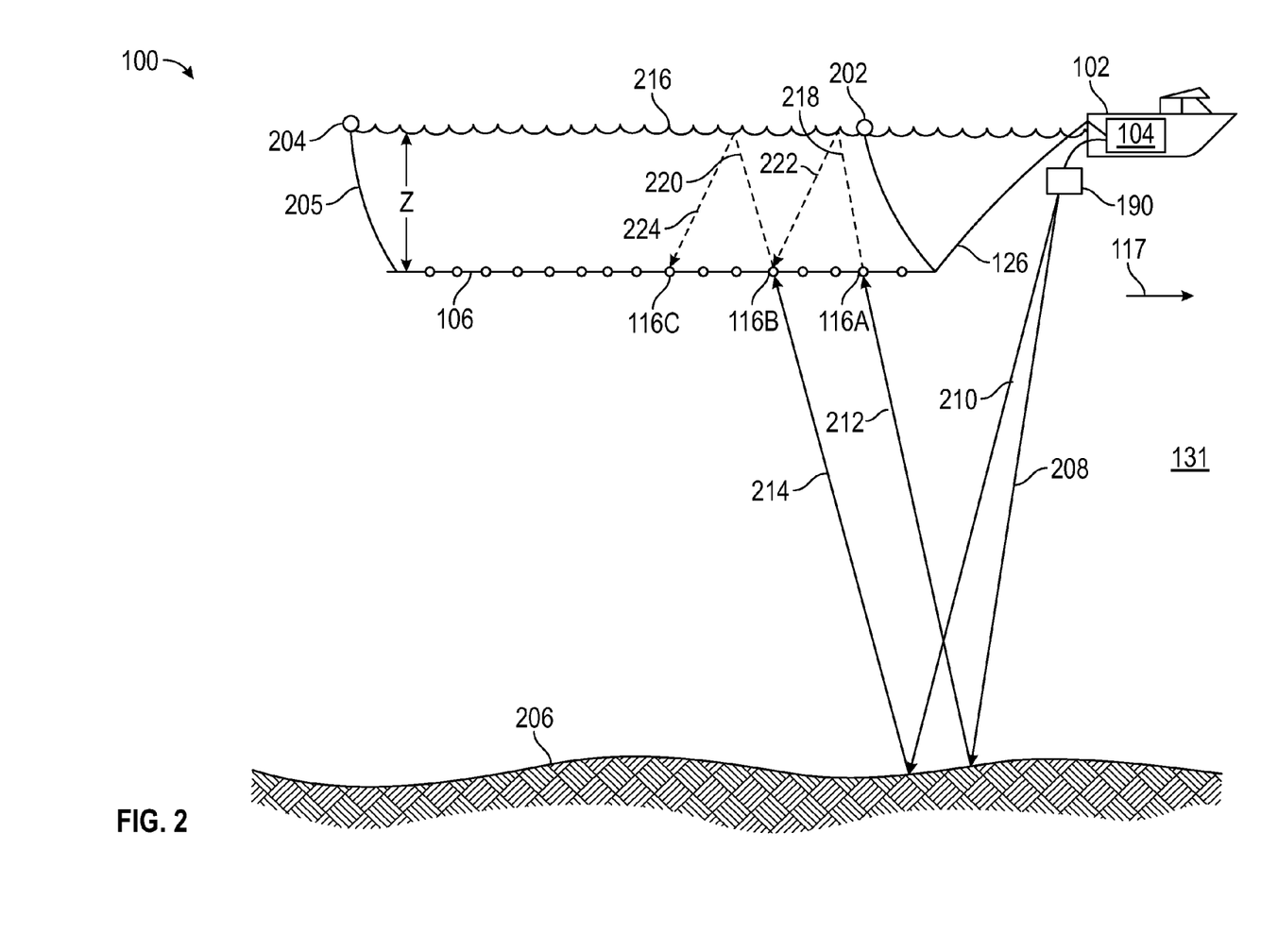
FIG. 2 shows a side elevation view of marine survey in accordance with at least some embodiments.

Turning first to FIG. 2, a side elevation view of a marine survey system 100 in accordance with some at least some embodiments is shown. FIG. 2 shows a streamer 106 being towed in a direction indicated by arrow 117 by tow vessel 102. In some embodiments, the forward portion of the sensor streamer may be associated with a lead buoy 202, where lead buoy 202 may help maintain the depth of the sensor streamer 106 and/or associated portion of the spreader line; however, in other cases the lead buoy 202 may be omitted, or other buoys (e.g., buoys associated with the spreader line 120 (not shown in FIG. 2)) may perform similar functions. FIG. 2 also illustrates a tail buoy 204. Tail buoy 204 may couple to the sensor streamer 106 by any suitable mechanism, such as line 205, sometimes referred as a "dead section". Tail buoy 204 may at least partially support the sensor streamer 106 at the selected depth z below the surface, and thus may help maintain the depth of the streamer 106; however, in other cases the tail buoy 204 may be omitted. Sensors 116 within streamer 106 detect seismic acoustic signals generated by acoustic source 190 under the control of systems within onboard equipment 104 including acoustic wavefields reflected from subsurface formations, shown in FIG. 2, by way of example, as seafloor 206. It would be appreciated by those skilled in the art, with the benefit of the disclosure, that other reflections may be produced by geologic formations disposed beneath seafloor 206, including hydrocarbon deposits contained therein but not shown in FIG. 2 for ease of illustration. It would be further appreciated by those skilled in the art that the principles of the embodiments described herein are the same regardless of the source of the subsurface reflections.

Acoustic source 190 emits an acoustic wavefield into water body 131. The acoustic wavefield propagates within the water body, and a portion of the wavefield propagates toward seafloor 206, as depicted by ray paths 208 and 210. Ray paths shown in FIG. 2, and FIGS. 3-5 below, depict aspects of the respective propagation paths through the water body of the various wavefields described herein. A reflected wavefield, depicted by ray paths 212 and 214 is returned, in this example, by seafloor 206 toward sensor streamer 106 and water body surface 216. The reflected wavefield is incident on the sensors in sensor streamer 106, (e.g. sensors 116A, B) which detect the reflected acoustic wavefield. As described above, sensors 116 may include sensors responsive to the pressure wavefield in the reflected acoustic wavefield and also sensors responsive to the fluid particle velocity wavefield therein. The reflected wavefield further propagates toward water body surface 216 as depicted by ray paths 218 and 220 (shown dashed in FIG. 2). Upon reaching water body surface 216, the acoustic wavefield may undergo a further reflection, the boundary between water body surface 216 and the air above the water body representing a discontinuity in acoustic impedance. A downward propagating wavefield, depicted by ray paths 222 and 224 (shown dashed in FIG. 2) then may impinge on sensors 116 (e.g. sensors 116B, 116C). This surface-reflected downward propagating wavefield may be referred to as a "ghost", or more particularly, a "receiver ghost". For simplicity of illustration, only two source generated ray paths and two ghost ray paths are depicted in FIG. 2, while an actual seismic source wave would define many ray paths originating at the acoustic source 190, reflected off the seafloor and subsurface structures, and reflected as ghost paths off the water body surface.

The upward propagating acoustic pressure wavefield and the surface-reflected downward propagating, or "ghost" acoustic pressure wavefield linearly superposed at the positions of sensors 116 may destructively interfere depending on the wavefield frequency, the depth, z, of the sensor streamer, and the emergence angle of the incoming wavefront. Thus, the destructive interference in the pressure signals may, for example, create a so-called ghost notch in the spectrum of the sensor signal.

By suitably combining signals from co-located pressure and particle motion sensors, for example by data processing systems within onboard equipment 104, the downward propagating ghost wavefield and the upward propagating wavefield reflected from the subsurface formations may be separated. For example, pressure signals from hydrophones and fluid particle velocity signals from co-located geophones may be combined to effect a separation of the wavefields. In at least some exemplary embodiments, the upward propagating or up-going and downward propagating or down-going pressure wavefields, $P_u$ and $P_d$ respectively, may be found from measured pressure and vertical fluid particle velocity wavefields in accordance with Equations (1) and (2):

$$P_u = \frac{1}{2}\left[P - \frac{\rho\omega}{k_z}V_z\right] \quad (1)$$

and $$P_d = \frac{1}{2}\left[P + \frac{\rho\omega}{k_z}V_z\right]. \quad (2)$$

In Equations (1) and (1) P represents the measured pressure wavefield by a sensor 116 comprising a hydrophone, say, and represented in the frequency-wavenumber domain. $V_z$ represents the vertical component of fluid particle velocity measured by a co-located geophone, say, also represented in the frequency-wavenumber domain. The frequency of the acoustic wavefield is represented by ω, the density of the fluid comprising water body 131, sea water, say, by ρ and the vertical wavenumber by $k_z$. The vertical wavenumber $k_z$, may be determined from the frequency, and horizontal wavenumbers in accordance with Equation (3):

$$k_z = \sqrt{\left(\frac{\omega}{c}\right)^2 - k_x^2 - k_y^2} \quad (3)$$

where c represents the speed of sound in the fluid comprising the water body, e.g. salt water, and $k_x$ and $k_y$ represent the horizontal wavenumbers, which may typically be in the inline (x) and cross-line (y) directions. In at least some embodiments, the fluid particle velocity measurements may be subject to low frequency noise. Thus, as described in the commonly-owned U.S. patent application Ser. No. 10/792,510 (U.S. Publication No. 2005/0195686), titled System for Combining Signals of Pressure Sensors and Particle Motion Sensors in Marine Seismic Streamers," issued as U.S. Pat. No. 7,359,283 which is hereby incorporated by reference as if fully reproduced herein, the vertical component of fluid particle velocity may be estimated from the pressure measurement as set forth in Equation 4:

$$V'_z = -\frac{k_z}{\rho\omega}\frac{1 - re^{-i2zk_z}}{1 + re^{-i2zk_z}}P \quad (4)$$

In Equation (4), $V'_z$, represents the estimated vertical component of fluid particle velocity based on the measured pressure, P, r represents the acoustic reflection coefficient at the surface of the water body, and z represents the depth of the sensor. The remaining symbols in Equation (4) are as previously described. The low frequency part of the measured vertical component of the fluid particle velocity may be replaced with the low frequency part of the estimated vertical velocity component. In at least some embodiments, the measured and estimated fluid particle velocities may be combined in the frequency domain via the application of high and low pass filters respectively:

$$V_z^{reb} = F^L V'_z + F_H V_z \quad (5)$$

where $F_L$ and $F_H$ represent the frequency-dependent weight functions of the low and high pass filters. The weight functions may be normalized such that $|F_H|+|F_L|=1$. In at least some embodiments, the low-high pass corner frequency of the filters may be set so that it is below the first ghost notch, for example, at a zero degree, relative to the vertical, emergent angle at a frequency below c/2z. In at least some other embodiments, $F_L$ and $F_H$ may be frequency and/or wavenumber dependent weight functions that are derived based on the signal to noise ratio. The value of $V_z^{reb}$ from Equation (5) may be used in the wavefield separation in Equations (1) and (1).

Figure 2A:
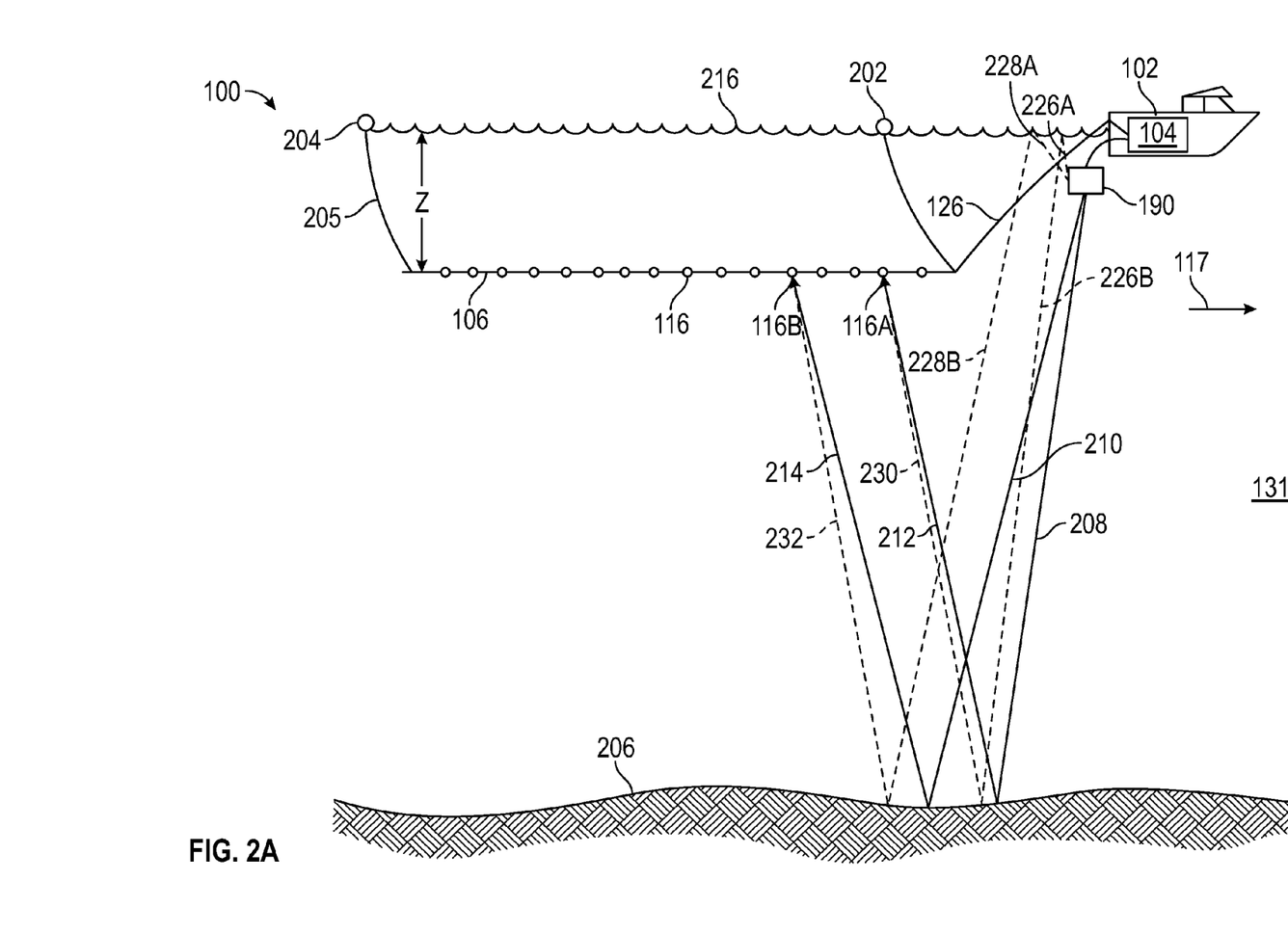
FIG. 2A shows additional aspects of the view of a marine survey in FIG. 2.

Additional aspects of the acoustic wavefields emitted by an acoustic source will now be described in conjunction with FIGS. 2A and 3. Consider first FIG. 2A, showing a side elevation view of a marine survey 200 as in FIG. 2. In FIG.

2, downward-propagating acoustic wavefields emitted by acoustic source 190 were considered. However acoustic source 190 emits an acoustic wavefield which propagates throughout water body 131. A portion of the wavefield propagates upward toward the surface 216 of the water body. Such an upward propagating wavefield is represented by ray paths 226A and 228A (shown dashed) in FIG. 2A. As previously described, the upward propagating wavefield reflects from the water body surface 216 and the reflected wavefield propagates downward toward seafloor 206. In FIG. 2A, the reflected wavefield is represented by ray paths 226B and 228B (shown dashed). Similar to ray paths 208, 210, a formation-reflected wavefield, depicted by ray paths 230 and 232 is returned, in this example, by seafloor 206 toward sensor streamer 106. The reflected wavefield is incident on the sensors in sensor streamer 106, (e.g. sensors 116A, B). The surface-reflected wavefield represented by ray paths 226B and 228B may be referred to a source ghost.

Further, a portion of the wavefield propagates, directly or via a sea surface reflection, from acoustic source 190 to sensors 116. These so-called direct arrivals are described in conjunction with FIG. 3. A portion of the acoustic wavefield propagates directly from the acoustic source to the sensors. For example, the three such direct arrivals represented by ray paths 302, 304 and 306 are shown incident on sensors 116D, 116E and 116F, respectively. Further, portions of the acoustic wavefield emitted into water body 131 propagate upward from acoustic source 190 toward the surface as illustrated by ray paths 303A, 305A and 307A (shown dashed in FIG. 3). On reflection by the surface of the water body, the reflected wavefield, illustrated by ray paths 303B, 305B and 307B, respectively (also shown dashed in FIG. 3), may propagate downward as direct arrivals and impinge on sensor streamer 106.

As described above, at the position of a sensor, the pressure wavefield measured thereby comprises the superposition of all of the wavefields, including the downward propagating source wavefields reflected from the subsurface formations, the ghost wavefields and the direct arrivals, incident on sensor streamer 106. Thus, when estimating the vertical fluid particle velocity from a pressure measurement, as described in conjunction with Equation (4), the effect of the receiver ghost pressure wavefield may be imposed on the estimate of the direct arrival fluid particle velocity. However, the direct arrival only has one ghost related with the depth of the source when the acoustic source is towed shallower than the sensor streamer, and thus, the direct arrival may not be correctly estimated. As a consequence, there may also be errors in the up-going and down-going wavefields after wavefield separation.

To address the foregoing, in accordance with the principles of the embodiments disclosed herein, the direct arrivals may be predicted by calculation and, to correct the measurement of the pressure and fluid particle velocity wavefields, be subtracted from the measured pressure and fluid particle motion data, respectively. The predicted direct arrivals may then be added back to the down-going wavefields following wavefield separation. The predicted direct arrivals may be calculated in accordance with Equation (6):

$$P'_n(\omega) = S_p(\omega) \left( \sum_{l=1}^{m} \frac{N_l(\omega) e^{-\frac{i\omega R_{ln}}{c}}}{R_{ln}} + r \sum_{l=1}^{m} \frac{N_l(\omega) e^{-\frac{i\omega R'_{ln}}{c}}}{R'_{ln}} \right) \quad (6)$$

where $P'_n(\omega)$ represents, in the frequency domain, a pressure signal at the frequency $\omega$ for the direct arrival at a sensor position, n. $S_p(\omega)$ represents the frequency-dependent response of a pressure sensor (e.g. hydrophone). Although a single acoustic source 190 is shown deployed in marine survey system 100, other embodiments may include two or more acoustic sources, as previously described. To account for such embodiments, the pressure signal in equation (6) includes a sum over a number, m, of sources, indexed by the symbol l. $N_l(\omega)$ represents the notional source signature as a function of frequency of the $l^{th}$ acoustic source. The notional source signature as a function of frequency may be, e.g. the Fourier transform of the time dependent notional source signature. In Equation (6) r represents the reflectivity of the sea surfrace; c represents the acoustic velocity in the medium comprising the water body; $R_{ln}$ represents the distance along the ray path from the $l^{th}$ acoustic source to the $n^{th}$ pressure sensor; and $R'_{ln}$ represents the distance along a ray path from the $l^{th}$ source to the water body surface and from the point of intersection of the ray path with the water body surface to the $n^{th}$ pressure sensor. For example, with respect to ray paths 307A and 307B, the distance $R'_{ln}$ may comprise the distance from source 190 to point 316 plus the distance from point 316 to sensor 116A. The distances may be calculated using the Pythagorean formula for calculating Euclidean distances. For example, if the position of the $l^{th}$ acoustic source in Cartesian coordinates is $(x_l^s, y_l^s, z_l^s)$ and the position of the $n^{th}$ pressure sensor in the same coordinate system is $(x_n^r, y_n^r, z_n^r)$, then $R_{ln} = \sqrt{(x_l^s - x_n^r)^2 + (y_l^s - y_n^r)^2 + (z_l^s - z_n^r)^2}$. If several sensors are connected in sensor arrays, e.g. sensor arrays 180-184, FIG. 1, the calculations may be repeated for each individual sensor position on the array and summed over the sensors comprising the array, as may be used with serial-connected sensor arrays, or stacked, i.e. summed and normalized to the number of sensors comprising the sensor array, as may be used with parallel-connected sensor arrays. The vertical component of fluid particle velocity of the predicted direct arrivals may be likewise calculated using Equation (7):

$$V'_{zn}(\omega) = \frac{S_{V_z}(\omega)}{\rho c} \left( \sum_{l=1}^{m} \cos\theta_{ln} \frac{N_l(\omega) e^{-\frac{i\omega R_{ln}}{c}}}{R_{ln}} + r \sum_{l=1}^{m} \cos\theta'_{ln} \frac{N_l(\omega) e^{-\frac{i\omega R'_{ln}}{c}}}{R'_{ln}} \right) \quad (7)$$

where $V'_{zn}(\omega)$ represents the calculated vertical component of the fluid particle velocity of the predicted direct arrival wavefield, at the position of the $n^{th}$ particle velocity sensor as a function of angular frequency, $\theta_{ln}$ is the angle relative to the vertical of the incoming ray path from the $l^{th}$ acoustic source to the $n^{th}$ particle velocity sensor and $\theta'_{ln}$ is the angle relative to the vertical of the incoming ray path reflected from the water body surface. FIG. 3 shows exemplary angles $\theta_{ln}$ and $\theta'_{ln}$ for ray paths 306 and 307B, respectively, incident on sensor 116F. $S_{V_z}$ represents the frequency-dependent response of the vertical fluid particle velocity sensor. Other symbols in Equation (7) are as in Equation (6). Similar expressions may be used to calculate the other components, e.g. x- and y-components of the predicted direct arrival fluid particle velocity.

The calculations as described in conjunction with Equations (6) and (7) include several parameters as inputs thereto. In some circumstances, some of these parameters, for example the relative positions of the sensors and acoustic sources, or the propagation velocity of sound in the water body may not be accurately known. In such embodiments, these parameters may be derived by finding the relative positions and velocity that minimizes an objective function based on a difference between the measured and predicted direct arrivals. Stated otherwise, the direct arrivals measured at the sensor streamers and the acoustic wavefields emitted by the acoustic sources may be used as an acoustic network to solve for the relative positions. Further, the reflectivity of the surface of the water body and properties of the notional source signatures may also be derived thereby. Exemplary objective functions to be minimized are the norm of the difference between the measured and predicted direct arrival pressure and fluid particle velocity wavefields, Equation (8):

$$\left\| \sum_n (P_n - P'_n)^2 \right\| \text{ and } \left\| \sum_n (V_{Z_n} - V'_{Z_n})^2 \right\| \quad (8)$$

where the symbols are as defined in Equations (6) and (7), the summation is, as before, over the n sensors, and for a quantity, W, which may be complex-valued, as set forth above, $\|W\|$ is the norm of W, $\|W\| = \sqrt{|W^2|}$.

Figure 6A:
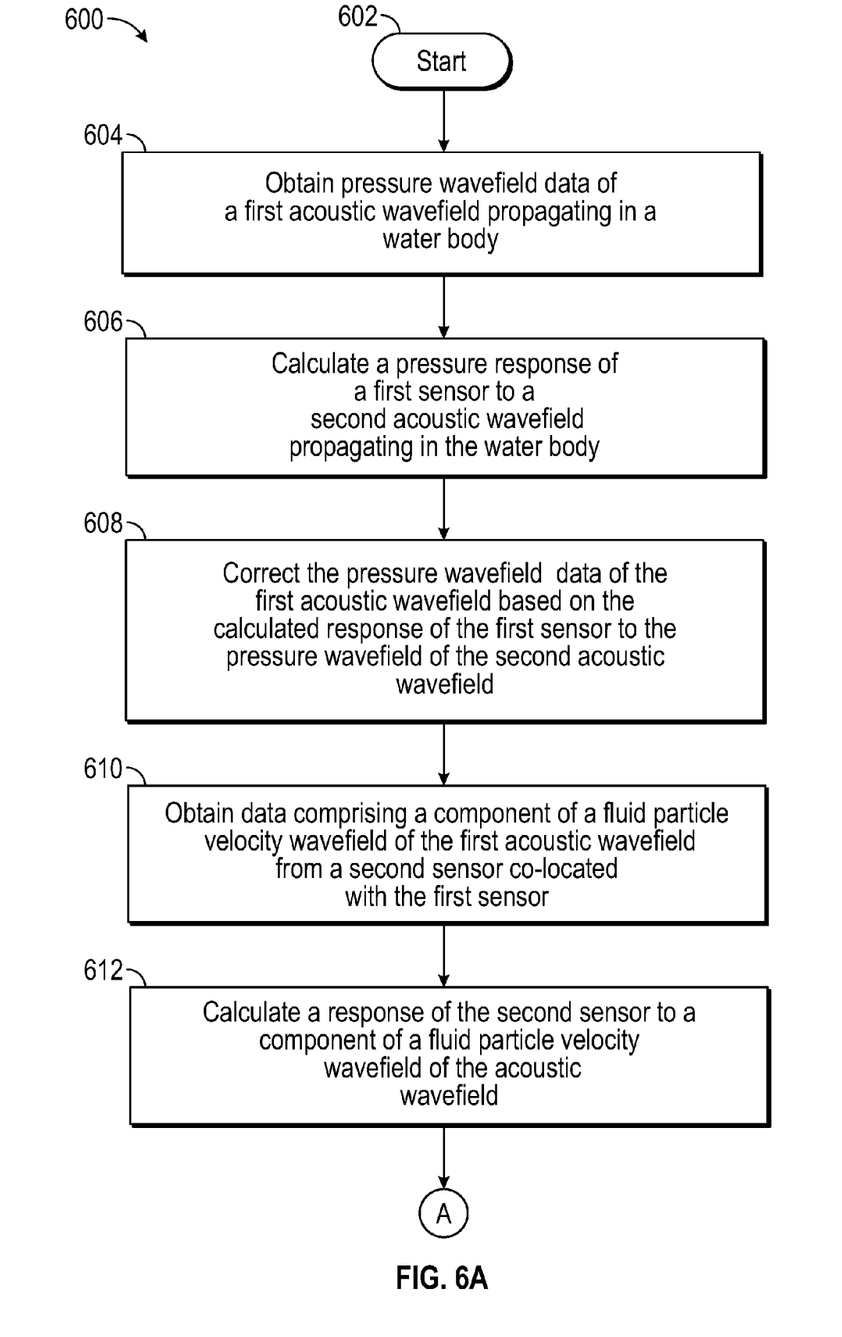
Figure 6B:
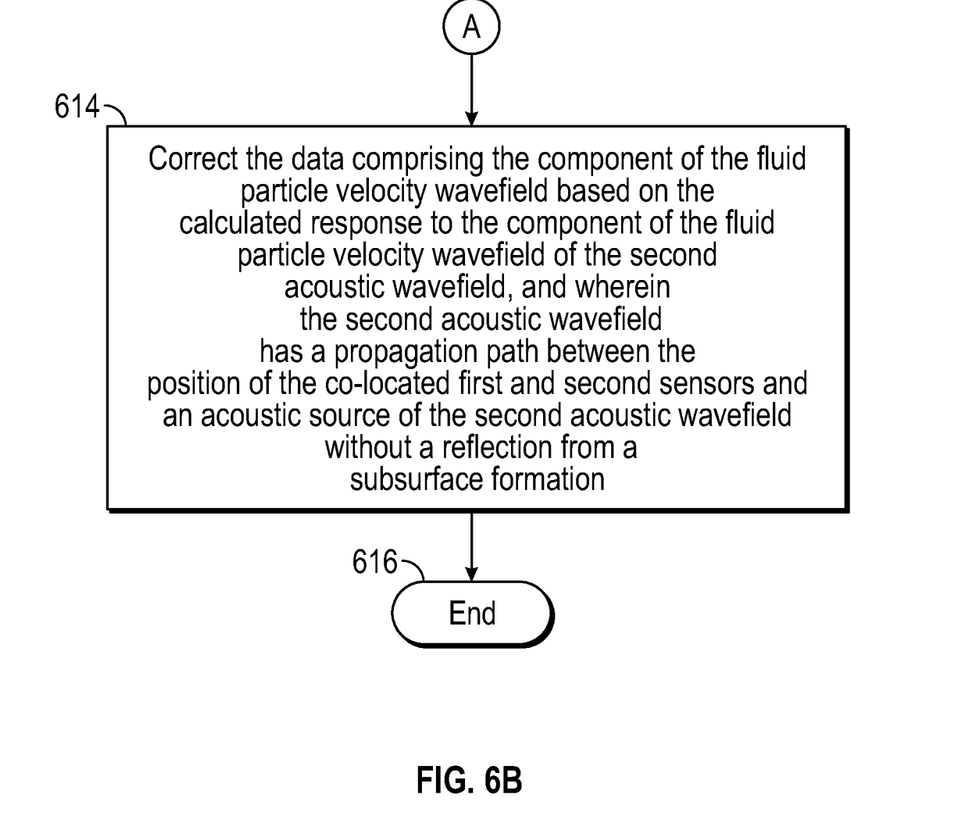

As described further in conjunction with FIG. 6, the measured pressure and fluid particle motions may be corrected for the direct arrivals. Wavefield separation may then be performed using data free of the direct arrivals. For example, the predicted direct arrivals, calculated as described above, may be subtracted from the measured pressure and fluid particle velocities, and the up-going and down-going wavefields separated. The direct arrivals may then be added back to the separated wavefields. If the acoustic source is towed at a shallower depth that the sensor streamers, as depicted in FIG. 3, for example, the direct arrivals should only be present in the down-going wavefields, so the predicted direct arrivals may thus be added only to the down-going pressure and/or particle velocity wavefields. If, however, the acoustic source or sources are towed at a greater depth than the sensor streamers the respective up-going wavefields may be back propagated and the down-going wavefields may be forward propagated to a datum deeper than the source depth, as will now be described in conjunction with FIG. 4.

Figure 3:
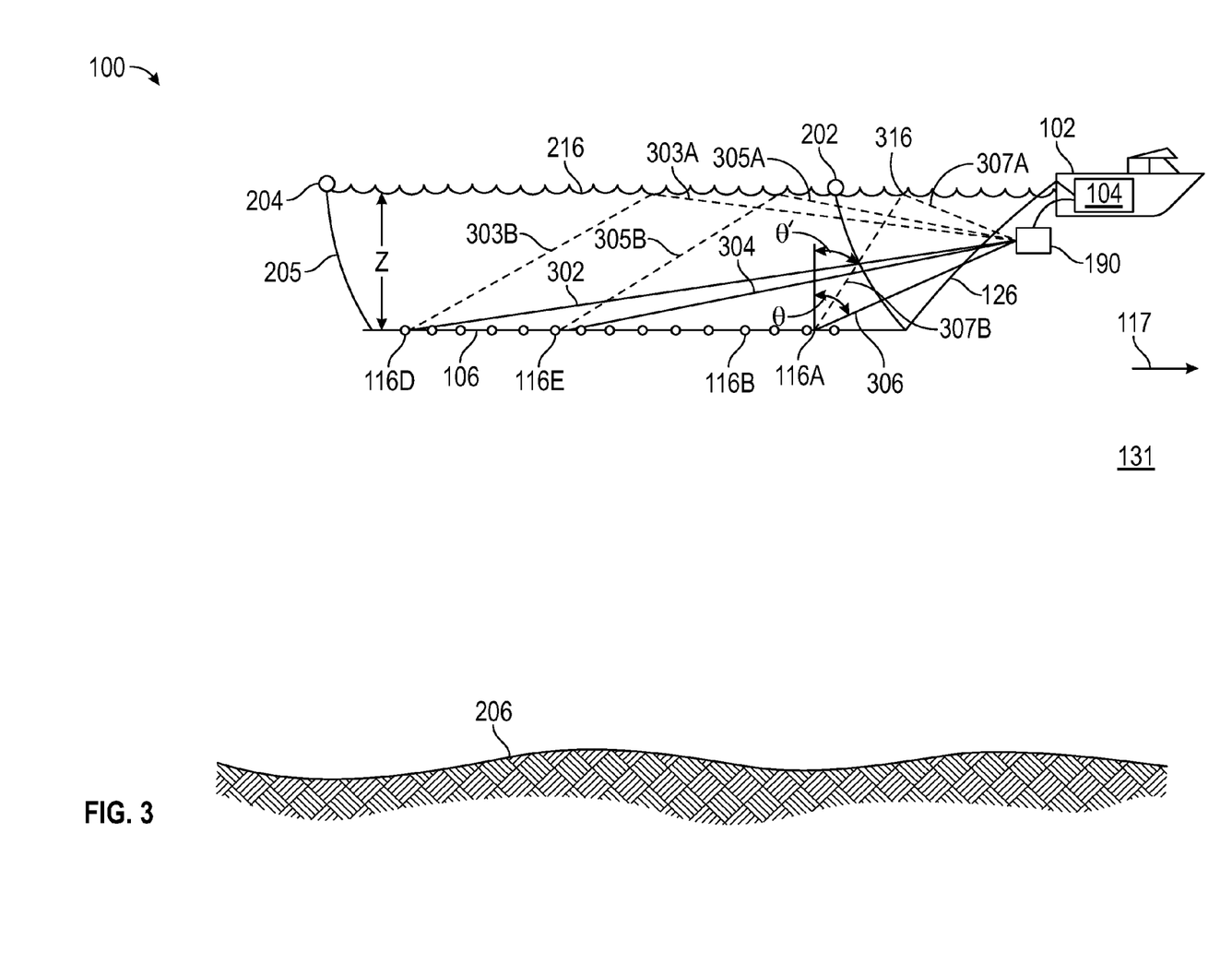
FIG. 3 shows a side elevation view of marine survey in accordance with at least some embodiments.
Figure 4:
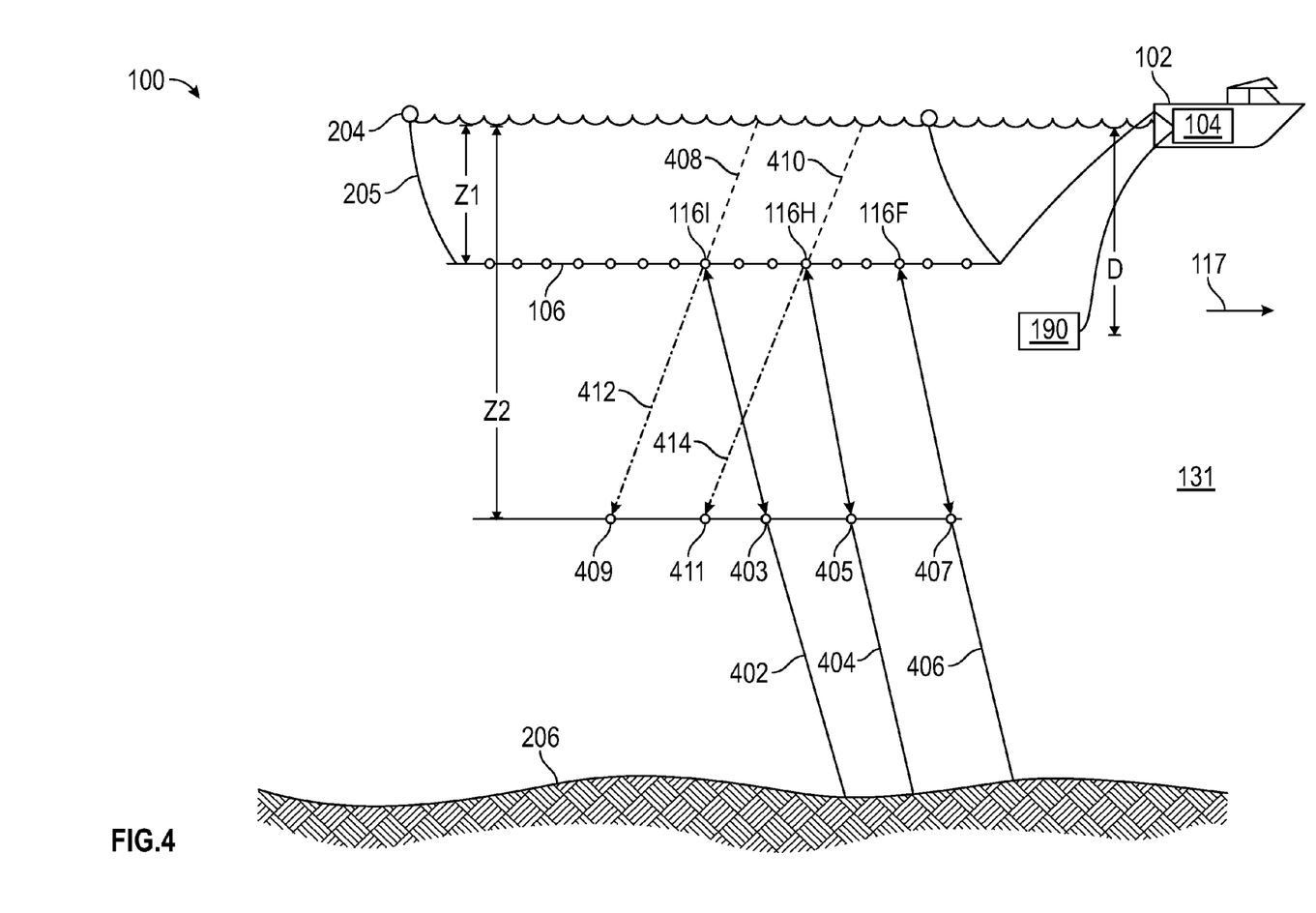
FIG. 4 shows a side elevation view of marine survey in accordance with at least some embodiments.

FIG. 4 shows a side elevation view of a marine survey system 100 similar to FIGS. 2 and 3. The illustrative embodiment of marine survey system 100 in FIG. 4 includes an acoustic source disposed at a depth, D, greater than the depth, $z_1$ of sensor streamer 106. FIG. 4 also shows the separated up-going wavefield, represented by ray paths 402, 404 and 406, and separated down-going wavefield, represented by ray paths 408 and 410 (shown dashed in FIG. 4), without inclusion of the direct arrivals. The direct arrivals will be considered below in conjunction with FIG. 5. Ray paths 402, 404 and 406, incident on sensors 116I, 116H and 116F, respectively may be back propagated from the depth $z_1$ to a datum at a depth $z_2$ using $P'_{up} = P_{up} e^{ik_z(z2-z1)}$, corresponding to positions 403, 405 and 407, respectively. $P'_{up}$ represents the back propagated pressure wavefield and $P_{up}$ the separated pressure wavefield at the depth $z_1$. Similarly, ray paths 408 and 410 may be forward propagated, along ray paths 412 and 414 (shown dash-dotted in FIG. 4), respectively, to positions 409 and 411 at the datum at depth $z_2$ using $P'_{down} = P_{down} e^{-ik_z(z2-z1)}$. The fluid particle velocity wavefields may be back- and forward-propagated similarly. The depth, $z_2$ of the datum may be any convenient choice such that $z_2 > z_1$. For example, $z_2$ may be chosen to be a few meters below $z_1$, say from 1 to 3 meters, but other values may be freely chosen as are convenient.

Figure 5:
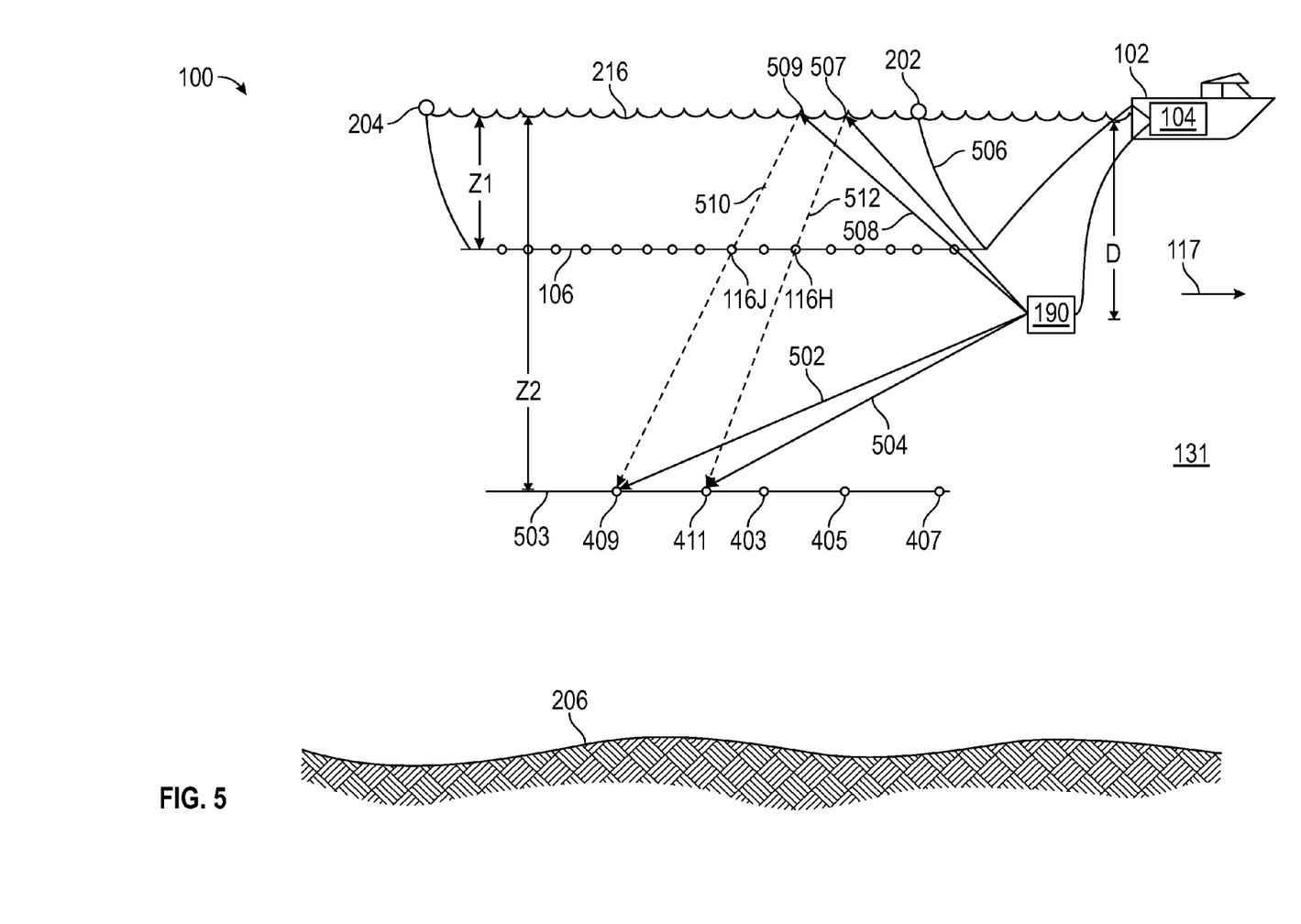
FIG. 5 shows a side elevation view of marine survey in accordance with at least some embodiments.

Consider now the direct arrivals by turning to FIG. 5. The downward propagating direct arrivals depicted by ray paths 502 and 502 may be re-predicted at the corresponding positions 409 and 411 at the datum 503 at depth $z_2$. These direct arrivals may be re-predicted using Equations (6) and (7) for the pressure and vertical component of the fluid particle velocity, respectively, with the distances $R_{jn}$ corresponding to positions at datum 503, for example positions 409 and 411. Similarly the upward propagating ray paths from acoustic source may reflect from water body surface 216 at positions 507 and 509 to become a downward propagating wavefield illustrated by ray paths 510 and 512 (shown dot-dashed in FIG. 5). These ray paths, incident on sensors 116J and 116H, respectively may be re-predicted at the datum 503. The distances $R'_{jn}$ correspond to positions on the datum 503, e.g. positions 409, 411 and comprise the sum of the Euclidean distance from acoustic source 109 to the respective reflection points, e.g. points 507 and 509 and the Euclidean distance from the reflection points to the positions on the datum 503.

In accordance with an example system, a geophysical data product may be produced. The geophysical data product may include pressure and fluid particle velocity wavefield measurement data corrected for direct arrivals as described above. The geophysical data product may be stored on a non-transitory, tangible computer-readable medium. The geophysical data product may be produced offshore (e.g., by equipment on a vessel) or onshore (e.g., at a facility on land) either within the United States or in another country. If the geophysical data product is produced offshore or in another country, it may be imported onshore to a facility, for example, in the United States. The imported geophysical data product may include recorded pressure wavefield data and data comprising a component or components of fluid particle velocity, both as described further below. The geophysical data product may also include corrected wavefield data and corrected fluid particle velocity component data. Once onshore in, for example the United States, geophysical analysis may be performed on the geophysical data product. In that vein, turning to FIG. 6, illustrated therein is a flowchart of an exemplary method 600 in accordance with at least some embodiments. Method 600 starts at block 602. As described above, an acoustic wavefield propagating in, say, a water body includes a pressure wavefield, and fluid particle velocity wavefield. At block 604, a pressure wavefield data of a first acoustic wavefield is obtained. The pressure wavefield data may be, in at least some embodiments, recorded data measured by a first sensor, for example a hydrophone, as described above. Stated otherwise, the first sensor may measure the pressure wavefield of the first acoustic wavefield, the pressure wavefield data being generated in response to the measuring. The pressure wavefield data may then be recorded, for example, by onboard equipment 104.

A pressure response of the first sensor to a pressure wavefield of a second acoustic wavefield propagating in the water body is calculated, block 606. The second acoustic wavefield has a propagation path between a source of the second acoustic wavefield and the position of the first sensor; the propagation path includes no reflection from a subsurface formation. Stated differently, the second acoustic wavefield comprises a so-called direct arrival—either a wavefield that propagates directly from the acoustic source to the sensor position or an acoustic wavefield that propagates from the acoustic source to the interface between the surface of a water body and the atmosphere, reflects from the interface and propagates downward to the position of the sensor. For example, the calculation in block 606 may be as described in conjunction with Equation (6) above. The calculation may be based on, inter alia, the distance along the propagation path between the acoustic source and the first sensor, the notional source signature, and the frequency response of the first sensor. In at least some embodiments, the calculation may be carried out by a processor executing a program of instructions as described in conjunction with FIG. 7. In at least some embodiments, the processor may be located onshore, and the foregoing calculation, and those to be described below, performed on recorded data from an acquisition as set forth above. As previously described, onboard equipment 104 may include data recording equipment to record the data for subsequent geophysical analysis onshore. In yet other embodiments, the processor may be associated with data processing equipment included in onboard equipment 104 and the foregoing calculation, and those described below, performed onboard, and the pressure and velocity wavefields corrected for direct arrivals stored in a non-transitory medium for subsequent geophysical analysis onshore.

In block 608, the pressure wavefield data of the first acoustic wavefield is corrected based on the calculated response of the first sensor to the pressure wavefield of the second acoustic wavefield. By way of example, the measured pressure wavefield may be corrected by subtracting the calculated response from the pressure wavefield data. The correction may also be performed by a processor executing a computer program. In at least some embodiments, the processor may be a component of a data processing system included as part of onboard equipment 104.

Data comprising a component, e.g. a vertical component, of a fluid particle velocity wavefield of the first acoustic wavefield is obtained in block 610. Similar to the pressure wavefield data, the fluid particle velocity data may include recorded data from as measured by a second sensor, such as a geophone, co-located with the first sensor. Stated otherwise, the second sensor may measure a component, or components, of the fluid particle velocity wavefield of the first acoustic wavefield, the data comprising the component of the fluid particle velocity wavefield being generated in response to the measuring. The data comprising the component of the fluid particle velocity wavefield may then be recorded by onboard equipment 104, say.

The response of the second sensor to the component of a fluid particle velocity field of the second acoustic wavefield may be calculated at block 612. The response may be calculated as described above in conjunction with Equation (7). In block 614, the data comprising the component of the fluid particle velocity wavefield may be corrected based on the calculated response of the second sensor to the component of a fluid particle velocity field of the second acoustic wavefield from block 612. For example, the calculated response may be subtracted from the fluid particle velocity wavefield component data. The calculated response, in at least some embodiments, may be based on, inter alia, the distance along the propagation path between the acoustic source and the second sensor, the acoustic source notional signature, the frequency response of the first sensor, and an angle between the propagation path of the second wavefield and a vertical direction. And as previously described, the second acoustic wavefield may have a propagation path between a source of the second acoustic wavefield and the position of the first sensor; the propagation path includes no reflection from a subsurface formation. Method 600 ends at block 616.

The first acoustic wavefield may be separated into an up-going wavefield portion and a down-going wavefield portion, based on the corrected pressure and fluid particle velocity measurements. For example, in at least some embodiments, the first acoustic wavefield may be separated in accordance with Equations (1) and (1) in which the pressure therein comprises the measured pressure as corrected in block 608. The fluid particle velocity may be measured and corrected based on the calculated fluid particle velocity response as described above at blocks 610 and 612. In at least some embodiments, the correction may comprise subtracting the calculated fluid particle velocity response from the measured fluid particle velocity, analogous to the correction of the measured pressure. In an embodiment in which the measured fluid particle velocity is corrected, the wavefield separated in accordance with Equations (1) and (1) may be based on the corrected vertical component of fluid particle velocity as well as the corrected pressure. As in the pressure wavefield correction, in at least some embodiments, the correction and/or wave field separation may be carried out by a processor executing computer program instructions.

Further, as described above in conjunction with Equation (4), in at least a low-frequency portion of the wavefield spectrum, the vertical component of fluid particle velocity may be estimated based on the fluid pressure wavefield. The wavefield separation may, in such embodiments, be based on the estimated vertical fluid particle velocity. Further still, to account for the direct arrivals in the down-going wavefield portion, the second acoustic wavefield may be added to the down-going wavefield portion.

As described above in conjunction with FIGS. 4 and 5, in some embodiments, the acoustic source may be disposed at a depth in the water body that is deeper than the depth of the sensor streamers. In such embodiments, the up-going wavefield may be back-propagated to a datum depth that is greater than the depth of the acoustic source and the down-going wave-field forward-propagated to the datum, as previously described. The respective pressure and fluid particle velocity sensor responses may be re-predicted at the corresponding positions at the datum depth. The re-predicted responses may then be added to the down-going wavefield portion.

Figure 7:
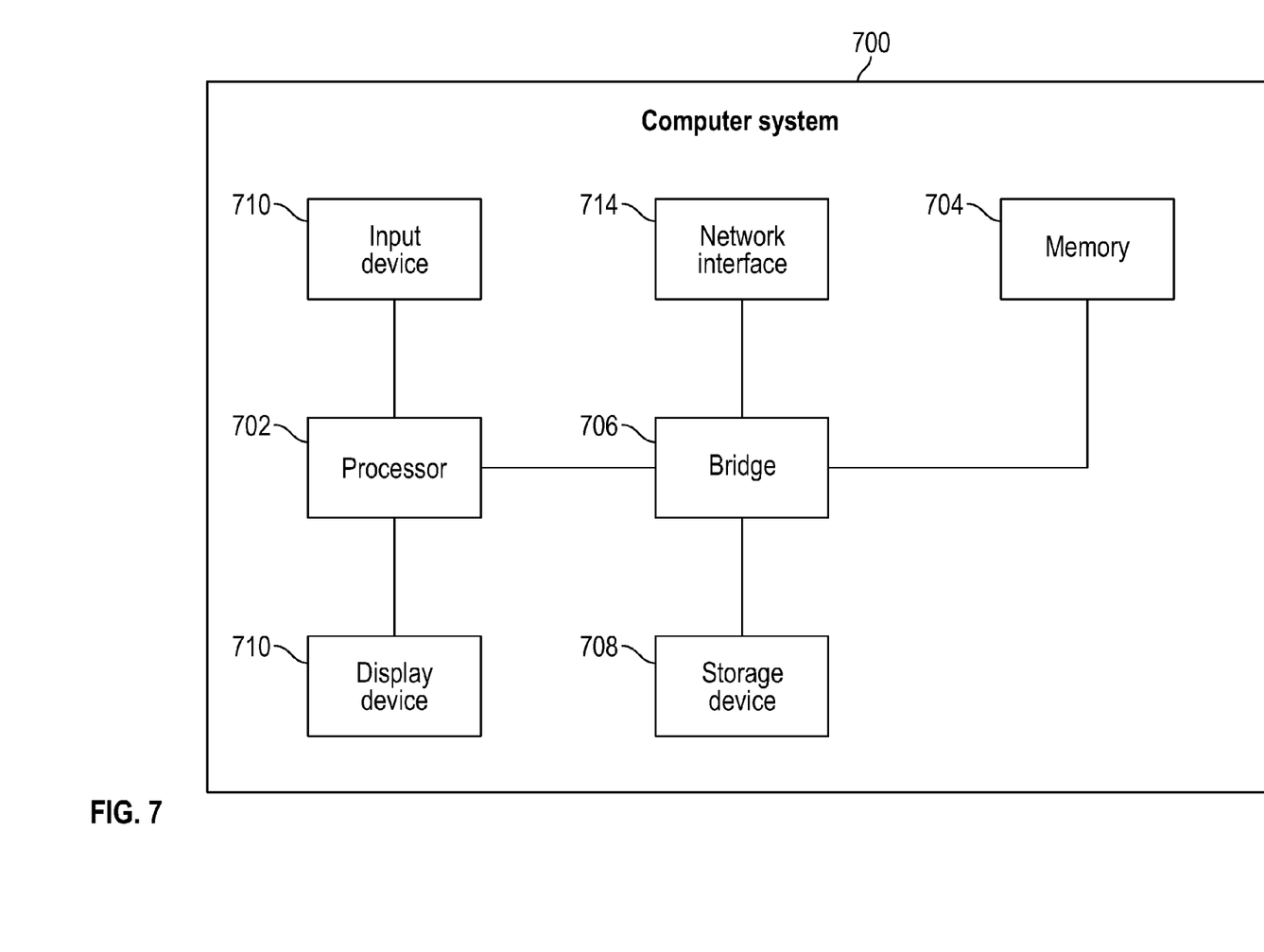
FIG. 7 shows a block diagram of a computer system in accordance with at least some embodiments.

FIG. 7 shows a block diagram of a computer system 700 which is illustrative of a computer system upon which the various embodiments may be practiced. In particular, computer system 700 comprises a processor 702, and the processor couples to a main memory 704 by way of a bridge device 706. Moreover, the processor 702 may couple to a long term storage device 708 (e.g., a hard drive, solid state disk, memory stick, optical disc) by way of the bridge device 706. Programs executable by the processor 702 may be stored on the storage device 708, and accessed when needed by the processor 702. The program stored on the storage device 708 may comprise programs to implement the various embodiments of the present specification. In some cases, the programs are copied from the storage device 708 to the main memory 704, and the programs are executed from the main memory 704. Thus, the main memory 704, and storage device 704 shall be considered computer-readable storage media. In addition, a display device 712, which may comprise any suitable electronic display device upon which any image or text can be displayed, may be coupled to the processor 702 by way of bridge 706. An input device or input devices, 710 may also be coupled to the processor by way of the bridge 706. Furthermore, computer system 700 may comprise a network interface 714, coupled to the processor 702 by way of bridge 706, and coupled to storage device 704, the network interface 714 acting to couple the computer system to a communication network, for example an Ethernet or similar network which may be employed to couple data processing system 700 to other components in onboard equipment 104. Relatedly, separated up-going and down-going wavefields, based on the measurements corrected for the direct arrivals as previously described, may be calculated by the processor 702 and communicated to the long term storage device 708 by way of bridge 706 to become a geophysical data product.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the exemplary embodiments may refer to a single acoustic source, the principles of those embodiments apply to a plurality of acoustic sources. It is intended that the following claims be interpreted to embrace all such variations and modifications.

What is claimed is:

1. A system comprising:
    a processor;
    a memory coupled to the processor;
    wherein the memory stores a program that, when executed by the processor, causes the processor to:
        calculate a pressure response of a first sensor;
        correct pressure wavefield data obtained from the first sensor responsive to a first acoustic wavefield, the correction based on the calculated pressure response of the first sensor; wherein:
            the calculated pressure response of the first sensor is responsive to a second acoustic wavefield having a propagation path between a source of the second acoustic wavefield and the first sensor; and
            wherein the propagation path includes no reflection from a subsurface formation.

2. The system of claim 1, wherein:
    the program further causes the processor to:
        calculate a fluid particle velocity response of a second sensor; and
        correct a component of fluid particle velocity wavefield data obtained from the second sensor responsive to the first acoustic wavefield, the correction based on the calculated fluid particle velocity response of the second sensor; and
            wherein the calculated fluid particle velocity response of the second sensor is responsive to the second acoustic wavefield at a position of the second sensor co-located with the first sensor.

3. The system of claim 1 wherein the program further causes the processor to correct the pressure wavefield data obtained from the first sensor by subtracting the calculated pressure response from the pressure wavefield data.

4. The system of claim 2 wherein the program further causes the processor to correct the component of the fluid particle velocity wavefield data obtained from the second sensor by subtracting the calculated fluid particle velocity response from the component of the fluid particle velocity wavefield data.

5. The system of claim 4 wherein the program further causes the processor to:
    separate the pressure wavefield data and fluid particle velocity wavefield data into an up-going wavefield data portion and a down-going wavefield data portion; and
    add the calculated pressure response and calculated fluid particle velocity response to the down-going wavefield data portion.

6. The system of claim 1, wherein:
    the pressure wavefield data is based on a measured first acoustic wavefield; and
    the calculated pressure response is based on the response of the first sensor including pressure sensitivity as a function of frequency of the measured first acoustic wavefield, and a signature of an acoustic source of the first acoustic wavefield as a function of frequency of the measured first acoustic wavefield.

7. The system of claim 1 wherein the propagation path has a first portion directed from an acoustic source to a surface of a water body and a second portion directed from the surface of the water body to the first sensor.

8. The system of claim 1 wherein the propagation path is directed from an acoustic source to the first sensor without reflection from a surface of a water body.

9. The system of claim 1 further comprising a first sensor configured to measure the pressure wavefield of the first acoustic wavefield.

10. The system of claim 1 further comprising an acoustic source configured to generate the first and second acoustic wavefields in a water body.

11. The system of claim 2 further comprising a second sensor configured to measure the component of the fluid particle velocity wavefield of the first acoustic wavefield.

12. A method comprising:
    obtaining pressure wavefield data of a first acoustic wavefield propagating in a water body;
    calculating, a pressure response of a first sensor to a second acoustic wavefield propagating in the water body;
    correcting the pressure wavefield data of the first acoustic wavefield based on the calculated response of the first sensor to the pressure wavefield of the second acoustic wavefield;
    obtaining data comprising a component of a fluid particle velocity wavefield of the first acoustic wavefield from a second sensor co-located with the first sensor;
    calculating a response of the second sensor to a component of a fluid particle velocity wavefield of the second acoustic wavefield;
    correcting the data comprising the component of the fluid particle velocity wavefield of the first acoustic wavefield based on the calculated response to the component of fluid particle velocity wavefield of the second acoustic wavefield; and
        wherein the second acoustic wavefield has a propagation path between a position of the co-located first and second sensors and an acoustic source of the second acoustic wavefield without a reflection from a subsurface formation.

13. The method of claim 12 wherein correcting the pressure wavefield data comprises subtracting the calculated pressure response from the pressure wavefield data.

14. The method of claim 12 further comprising:
estimating a vertical component of a fluid particle velocity wavefield of the first acoustic wavefield based on the corrected pressure wavefield data; and
filtering the estimated vertical component of fluid particle velocity wavefield by a low-pass filter to generate a first filtered portion of a vertical fluid particle velocity wavefield data.

15. The method of claim 14 wherein a corner frequency of the low-pass filter is less than a frequency of a first ghost notch in a pressure wavefield of the first acoustic wavefield.

16. The method of claim 14 further comprising:
filtering the data comprising the component of the fluid particle velocity wavefield by a high-pass filter to generate a second filtered portion of the fluid particle velocity wavefield data; and
adding the first and second filtered portions of the fluid particle velocity wavefield data.

17. The method of claim 12 further comprising:
separating the first acoustic wavefield into an up-going wavefield portion and a down-going wavefield portion based on the corrected pressure wavefield data; and
adding the calculated pressure response of the first sensor to the down-going wavefield portion.

18. The method of claim 17 wherein separating the first acoustic wavefield into up-going and down-going wavefield portions is further based on first and second filtered portions of the data comprising a component of the fluid particle velocity wavefield of the first acoustic wavefield.

19. The method of claim 12 wherein calculating the response of the first sensor is based on a distance along the propagation path between the position of the first sensor and the acoustic source.

20. The method of claim 17 wherein a depth of the acoustic source is beneath the position of the first sensor, the method further comprising:
back propagating the up-going wavefield portion to a datum having a depth below the depth of the acoustic source; and
forward propagating the down-going wavefield portion to the datum.

21. The method of claim 20 further comprising re-predicting the pressure response of the first sensor to the pressure wavefield of the second acoustic wavefield at one or more positions on the datum based on the corresponding forward-propagated down-going and back-propagated up-going wavefield portions.

22. The method of claim 19 wherein calculating the response of the first sensor is further based on a source signature of the acoustic source and a frequency-dependent response of the first sensor.

23. The method of claim 12 wherein calculating the response of the second sensor is based on the source signature of the acoustic source, and a frequency-dependent response of the second sensor, and an angle of the propagation path between the position of the first and second sensors and the acoustic source, and a vertical direction.

24. The method of claim 12 further comprising:
measuring, by the first sensor, a pressure wavefield of the second acoustic wavefield; and
deriving the position of the first sensor by minimizing an objective function based on a difference between the calculated response of the first sensor to the pressure wavefield of the second acoustic wavefield and the measurement of the pressure wavefield of the second acoustic wavefield.

25. The method of claim 12 further comprising:
measuring the pressure wavefield of the first acoustic wavefield by the first sensor, the pressure wavefield data generated in response to the measuring; and
measuring the component of the fluid particle velocity wavefield by the second sensor, the data comprising the component of fluid particle velocity generated in response to the measuring.

26. The method of claim 25 further comprising:
recording the pressure wavefield data; and
recording the data comprising the component of fluid particle velocity.

27. The method of claim 26 further comprising:
importing a geophysical data product, the geophysical data product including:
the recorded pressure wavefield data; and
the recorded data comprising the component of the fluid particle velocity wavefield.

28. The method of claim 27, wherein the geophysical data product further comprises:
corrected data comprising the component of the fluid particle velocity wavefield; and
corrected pressure wavefield data.

* * * * *